3,274,266
PROCESS FOR THE PRODUCTION OF
TETRABROMOCYCLODODECENE
Karl Mönkemeyer and Hermann Sauer, Marl, Germany,
assignors to Chemische Werke Huls Aktiengesellschaft,
Marl, Germany, a corporation of Germany
No Drawing. Filed Sept. 26, 1963, Ser. No. 311,646
Claims priority, application Germany, Mar. 30, 1963,
C 29,532
4 Claims. (Cl. 260—648)

In the halogenation of olefines the addition reaction is favored only at low temperatures and within a relatively narrow temperature range. This temperature range is very narrow in the bromination of cyclododecatriene and even at 0° C. the addition reaction is accompanied by a considerable substitution reaction which greatly reduces the yield of tetrabromocyclododecene. If the reaction is carried out at −20 to −30° C. in the presence of known diluents such as carbon tetrachloride it proceeds very slowly and the yield of tetrabromocyclododecene is at most only about 40% of the theoretical yield. When dibromoethane, benzene, ethyl acetate, glacial acetic acid or formic acid is used as diluene the reaction temperature must be raised which in turn favors the substitution reaction so that the yield of tetrabromocyclododecene remains low. If one uses a mixture of the named diluents the process can be carried out at −20° C. but there is no resulting improvement in yield.

It has now been found that tetrabromocyclododecene can be made very simply by the addition of bromine to cyclododecatriene if the reaction is carried out in the presence of propionic acid as the diluene. The cis-trans-trans-cyclododecatriene-1,5,9 or the trans-trans-trans-cyclododecatriene-1,5,9 or mixtures of these isomers may be used as the cyclododecatriene starting material. The bromine is used in amounts within the range from 2 to 2.2 mole per mole of the cyclododecatriene. The reaction temperature is maintained within the range from −25° to 0° C., preferably −25° to −15° C.

The reaction may be carried out by providing a solution of cyclododecatriene in propionic acid in a weight ratio within the range from 1:0.3 to 1:15, preferably from 1:5 to 1:10, cooled to the desired temperature and while maintaining the chosen reaction temperature gradually introducing a solution of bromine in propionic acid in a weight ratio within the range from 1:0.3 to 1:15 preferably from 1:2.5 to 1:5 with stirring. The weight ratio of the cyclododecatriene to the total amount of propionic acid in the reaction mixture should be within the range from 1:4 to 1:16, preferably from 1:10 to 1:15.

The immediate addition of bromine is indicated by the separation of tetrabromocyclododecene crystals. The reaction mixture suitably is stirred to complete the reaction. The presence of heavy metal in the reaction mixture is to be avoided because it favors the substitution reaction.

The working up of the reaction mixture is carried out generally by suction filtering or centrifuging to separate the crystalline tetrabromocyclododecene. The separated crystal pulp is washed first with propionic acid and then with water and finally with a mixture of water and methanol and then dried. The resulting crude tetrabromocyclododecene which has a melting point between 140 and 160° C. and a bromine content of from 65 to 68% is sufficiently pure for most technical uses. By recrystallization e.g. from benzene, glacial acetic acid or toluene pure tetrabromocyclododecene having a melting point of 160–161° C. can be made. The propionic acid can be recovered from the mother liquor by vacuum distillation and reused in a repetition of the process.

The tetrabromocyclododecene may be used to render polymers such as polystyrene and polyolefines difficultly flammable.

Example 1

A solution of 162 g. (1 mol) of cyclododecatriene in 810 g. of propionic acid (dilution ratio 1:5) is cooled to −20° C. and a solution of 352 g. (2.2 mol) of bromine in 1760 g. of propionic acid (dilution ratio 1:5) is introduced over a period of 1 hour. The reaction mixture is stirred and cooled to maintain the selected temperature (−20° C.) during the addition of the bromine solution. As soon as ⅓ of the total amount of bromine has been introduced crystals of the tetrabromocyclododecene begin to separate. The stirring of the reaction mixture after completion of the addition of bromine solution is continued for 1 hour while maintaining the temperature to complete the reaction. The dilution ratio of cyclododecatriene to the total propionic acid in the reaction mixture is 1 to 15.8. The tetrabromocyclododecene is separated from the mother liquor by suction filtration and the crystal pulp is washed successively with propionic acid, water and a water-methanol mixture and then dried. The mother liquor is distilled under reduced pressure to recover the propionic acid which is used in a repetition of the process. 338 g. (70% of the theoretical yield) of tetrabromocyclododecene having a bromine content of 67.6% is obtained. This product melts at 149–160° C. and after recrystallization from benzene the product melts at 160–161° C.

Example 2

A solution of 162 g. (1 mol) of cyclododecatriene in 1500 g. of propionic acid (dilution ratio 1:9.3) was cooled to −20° C. and a solution of 336 g. (2.1 mol) of bromine in 120 g. of propionic acid (dilution ratio 1:0.36) was introduced over a period of 1 hour with vigorous stirring of the resulting mixture. The course of the reaction and the working up of the reaction mixture was the same as in Example 1. The dilution ratio of the cyclododecatriene to the total propionic acid was 1:10. 328 g. (68% of theory) of tetrabromocyclododecene having a bromine content of 66.9% were recovered. It had a melting point of from 142 to 153° C.

We claim:
1. Process for the production of tetrabromocyclododecene which comprises reacting bromine with cyclododecatriene in a mole ratio within the range from 2:1 to 2.2:1 in the presence of propionic acid, the weight ratio of cyclododecatriene to total propionic acid being within the range from 1:4 to 1:16, at temperatures within the range from −25 to 0° C.

2. Process as defined in claim 1 in which a solution of bromine in propionic acid in a weight ratio within the range from 1:0.3 to 1:15 is mixed with a solution of cyclododecatriene in propionic acid in a weight ratio within the range from 1:0.3 to 1:15.

3. Process as defined in claim 2 in which the ratio of bromine to propionic acid in the solution thereof is within the range from 1:2.5 to 1:5 and the ratio of cyclododecatriene to propionic acid in the solution thereof is within the range from 1:5 to 1:10.

4. Process as defined in claim 1 in which the temperature is within the range from −25 to −15° C. and the weight ratio of cyclododecatriene to total propionic acid is within the range from 1:10 to 1:15.

References Cited by the Examiner

UNITED STATES PATENTS 3,025,329   3/1962   Gleason ------------ 260—648

FOREIGN PATENTS 1,147,575   4/1963   Germany.

OTHER REFERENCES

Zakharkin et al., "Doklady Akad. Nauk. S.S.S.R." 132, 1078–81 (1960).

LEON ZITVER, *Primary Examiner.*

K. H. JOHNSON, M. M. JACOB, *Assistant Examiners.*